US010175045B2

(12) United States Patent
Ono et al.

(10) Patent No.: US 10,175,045 B2
(45) Date of Patent: Jan. 8, 2019

(54) VIBRATOR DRIVE CIRCUIT

(71) Applicant: Murata Manufacturing Co., Ltd., Nagaokakyo-shi, Kyoto-fu (JP)

(72) Inventors: Hidekazu Ono, Hamamatsu (JP); Nobuaki Tsuji, Hamamatsu (JP); Tsuyoshi Okami, Hamamatsu (JP); Takashi Mizota, Hamamatsu (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 106 days.

(21) Appl. No.: 15/263,545

(22) Filed: Sep. 13, 2016

(65) Prior Publication Data

US 2016/0377435 A1 Dec. 29, 2016

Related U.S. Application Data

(63) Continuation of application No. PCT/JP2015/056902, filed on Mar. 10, 2015.

(30) Foreign Application Priority Data

Mar. 25, 2014 (JP) ................................. 2014-061258

(51) Int. Cl.
*G01C 19/5726* (2012.01)
(52) U.S. Cl.
CPC ................................ *G01C 19/5726* (2013.01)
(58) Field of Classification Search
CPC .................................................. G01C 19/5726
See application file for complete search history.

(56) References Cited

U.S. PATENT DOCUMENTS 5,347,361 A * 9/1994 Kay ...................... G01C 19/664
356/475
7,028,548 B2 * 4/2006 Higuchi ............. G01C 19/5719
73/504.16

(Continued)

FOREIGN PATENT DOCUMENTS

JP H1164002 A 3/1999
JP H11183178 A 7/1999

(Continued)

OTHER PUBLICATIONS

International Search Report issued for PCT/JP2015/056902, dated Apr. 14, 2015.

(Continued)

*Primary Examiner* — Ryan D Walsh
(74) *Attorney, Agent, or Firm* — Arent Fox LLP

(57) ABSTRACT

A vibrator drive circuit is configured to drive a vibrator mass 3 in a prescribed vibration direction. The vibrator drive circuit includes a drive unit configured to drive a vibrator based on a reference signal SG1 of a predetermined frequency to cause the vibrator to vibrate in a vibration direction, a phase detector configured to detect a vibration waveform of the vibrator in the vibration direction and to output an output voltage Vcnt in accordance with a phase difference between reference signal SG1 and a vibration waveform thereof, and two capacitors each formed of a movable electrode provided in the vibrator and a fixed electrode provided to face the movable electrode, the output voltage Vcnt being applied to the fixed electrode. The phase detector is configured to adjust the output voltage Vcnt in accordance with the phase difference, thereby changing electrostatic force in each of the capacitors for controlling the phase difference to be 90 degrees.

18 Claims, 10 Drawing Sheets

(56) References Cited

U.S. PATENT DOCUMENTS

| 7,093,487 B2 | 8/2006 | Mochida |
| 2004/0187576 A1 | 9/2004 | Ito |
| 2005/0066726 A1 | 3/2005 | Mochida |
| 2009/0084180 A1 | 4/2009 | Yoshida et al. |
| 2013/0152664 A1* | 6/2013 | Pyo .................. G01P 21/00 73/1.38 |

FOREIGN PATENT DOCUMENTS

| JP | 2004294405 A | 10/2004 |
| JP | 2005106550 A | 4/2005 |
| JP | 2005027481 A1 | 12/2005 |
| JP | 2005351820 A | 12/2005 |
| JP | 2009031007 A | 2/2009 |

OTHER PUBLICATIONS

Written Opinion of the International Searching Authority issued for PCT/JP2015/056902, dated Apr. 14, 2015.

\* cited by examiner

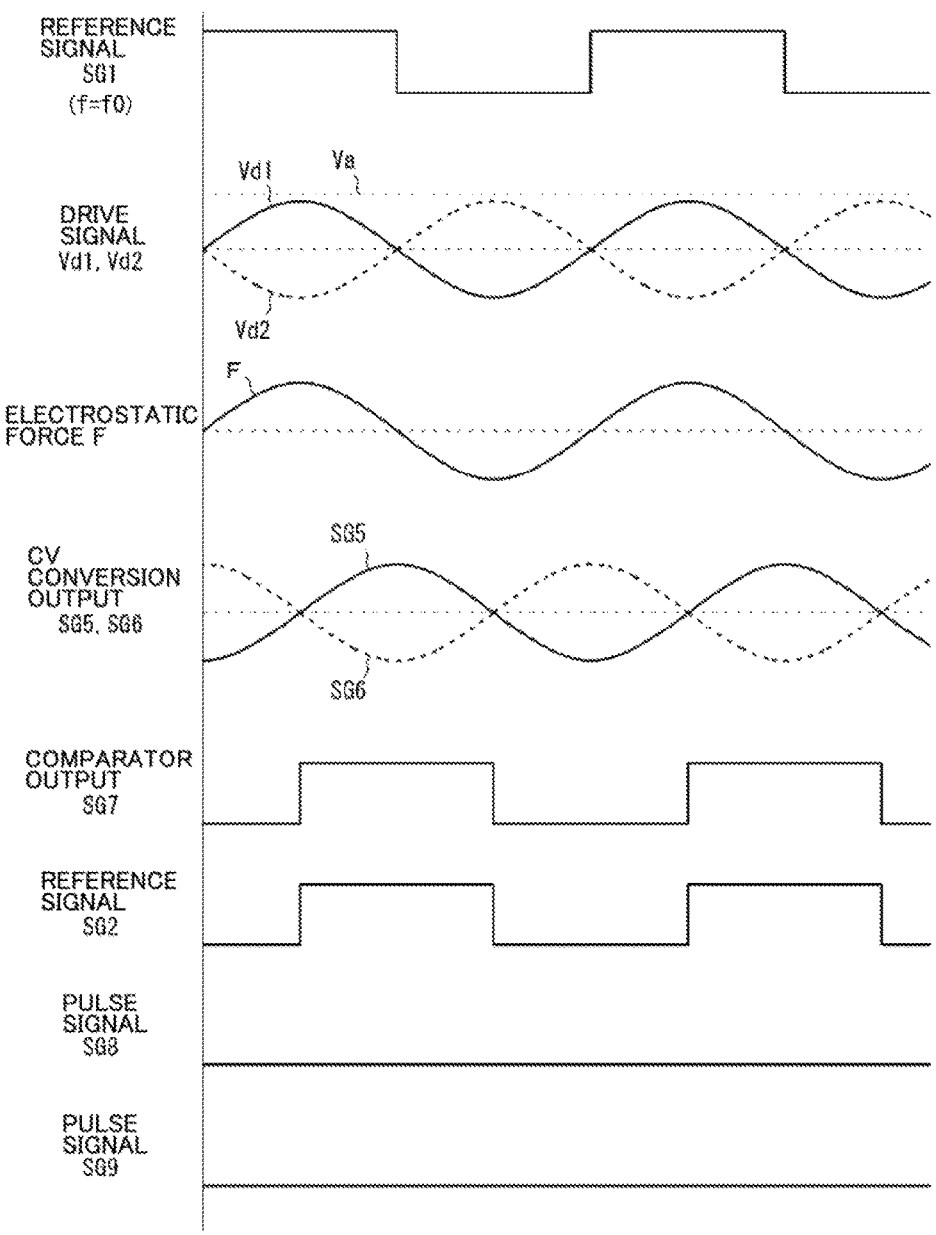

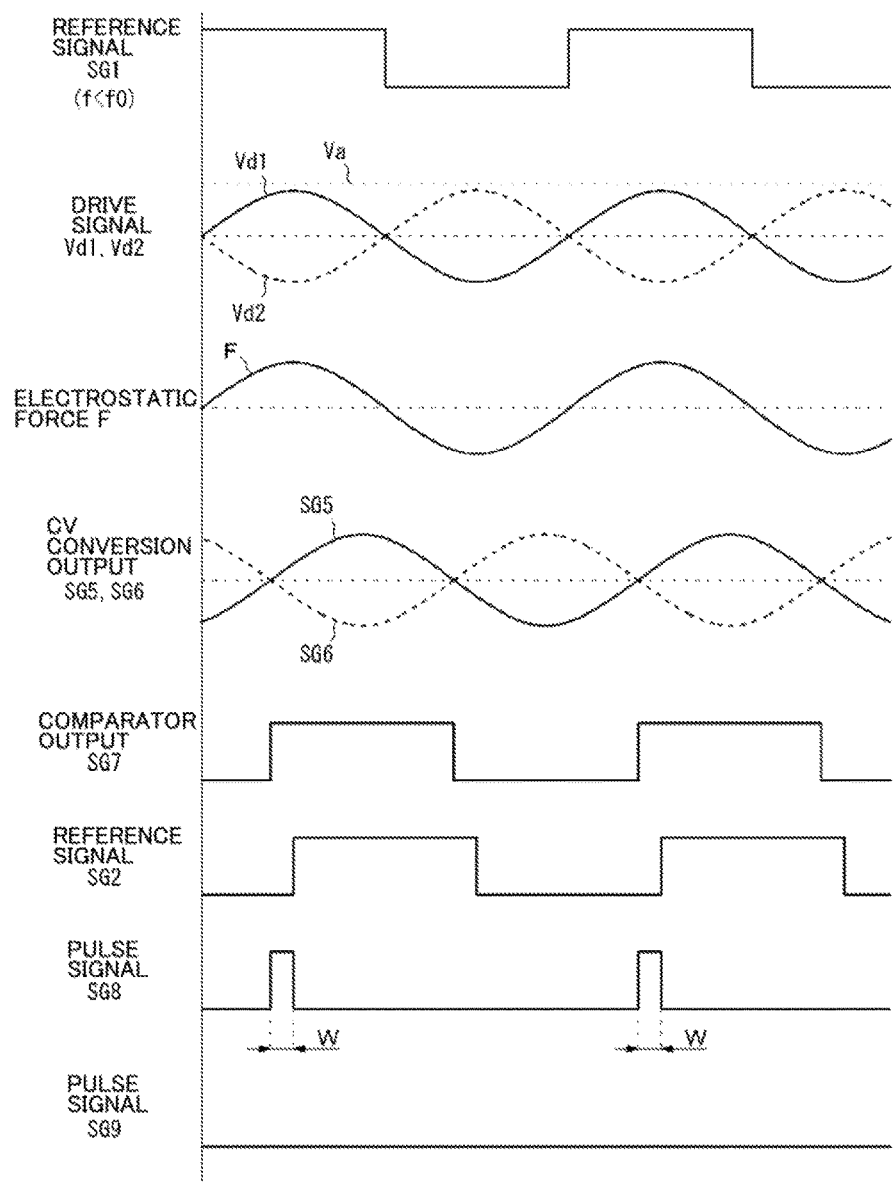

VIBRATOR DRIVE CIRCUIT

CROSS REFERENCE TO RELATED APPLICATIONS

The present application is a continuation of International application No. PCT/JP2015/056902, filed Mar. 10, 2015, which claims priority to Japanese Patent Application No. 2014-061258, filed Mar. 25, 2014, the entire contents of each of which are incorporated herein by reference.

TECHNICAL FIELD

The present invention relates to a vibrator drive circuit included in a vibration-type angular velocity sensor and causing a vibrator to vibrate in a prescribed vibration direction.

BACKGROUND ART

A vibration-type angular velocity sensor serves as a sensor for measuring the magnitude of the angular velocity by causing a vibrator to vibrate at a predetermined frequency in a prescribed vibration direction, thereby generating Coriolis force in accordance with the angular velocity acting from the outside, and detecting the displacement amount of the vibrator caused by the Coriolis force in the direction orthogonal to the vibration direction. The vibrator is supported by a spring structure or the like, and the Coriolis force is increased in proportion to the vibration velocity of the vibrator. In order to improve the sensitivity of the angular velocity sensor, it is necessary to increase the vibration amplitude of the vibrator in the vibration direction to increase its vibration velocity. Thus, the above-described angular velocity sensor generally serves to detect the vibration amplitude of the vibrator and apply positive feedback with a drive signal for driving the vibrator, thereby causing the vibrator to self-excite at a resonance frequency (see, for example, PTD 1).

Among the conventional angular velocity sensors, there is a known angular velocity sensor that is equipped with a plurality of vibrators for measuring the tri-axial angular velocity (see, for example, PTD 2). In general, when a plurality of vibrators are mounted in an angular velocity sensor, the resonance frequencies of the vibrators are varied. Accordingly, a drive circuit for causing the vibrators to self-oscillate should be provided for each of the vibrators. This poses a problem that the drive circuit is increased in circuit scale, and power consumption. Furthermore, in the case where the plurality of vibrators are caused to self-oscillate at different resonance frequencies, it becomes necessary to separately generate synchronous detection signals synchronized with the corresponding resonance frequencies of the vibrators in order to synchronously detect the vibrating component of the Coriolis force. This also poses a problem that not only the drive circuit but also the control circuit for synchronously detecting the vibrating component of the Coriolis force is increased in circuit scale, so that power consumption is also increased. In order to solve the above-described problems, according to the conventional technique disclosed in PTD 2, a plurality of vibrators are coupled structurally dynamically to cause the resonance frequencies of the vibrators to coincide, so that drive circuits for driving a plurality of vibrators are implemented by a single circuit.

CITATION LIST

Patent Document

PTD 1: Japanese Patent Laying-Open No. 2009-31007
PTD 2: Japanese Patent Laying-Open No. 11-64002

SUMMARY OF INVENTION

It is extremely difficult to dynamically couple a plurality of vibrators to cause resonance frequencies to coincide with one another, as in the conventional technique disclosed in the above-mentioned PTD 2. To solve this problem, the present invention causes the resonance frequencies of a plurality of vibrators to coincide with one another, thereby making it possible to share at least a part of the circuit configuration for driving each of the vibrators, so that circuit scale and power consumption can be reduced. To this end, the present invention provides a vibrator drive circuit for driving a vibrator in a prescribed vibration direction. The vibrator drive circuit includes a drive unit configured to drive the vibrator based on a reference signal of a predetermined frequency to cause the vibrator to vibrate in the vibration direction, a phase detector configured to detect a vibration waveform of the vibrator in the vibration direction and output an output voltage in accordance with a phase difference between the reference signal and the vibration waveform, and a capacitor formed of a movable electrode provided in the vibrator and a fixed electrode provided so as to face the movable electrode, the output voltage being applied to the fixed electrode. The phase detector is configured to adjust the output voltage in accordance with the phase difference to change electrostatic force in the capacitor for controlling the phase difference to be 90 degrees.

The vibrator drive circuit may further include a reference signal generator configured to generate the reference signal. It is preferable that the vibrator is supported by a spring structure so as to be able to vibrate in the vibration direction, and the predetermined frequency is lower than a resonance frequency of the vibrator supported by the spring structure.

The present invention preferably provides a vibrator drive circuit for driving a plurality of vibrators which vibrate in different vibration directions. The vibrator drive circuit includes a capacitor formed of a movable electrode and a fixed electrode facing the movable electrode, the movable electrode being provided in each of the plurality of vibrators, and displaced together with a corresponding one of the plurality of vibrators; a drive unit configured to drive each of the plurality of vibrators based on a reference signal of a predetermined frequency to cause each of the plurality of vibrators to vibrate, and a phase detector provided in each of the plurality of vibrators and configured to detect a vibration waveform of each of the vibrators and apply, to the fixed electrode of the capacitor, an output voltage in accordance with a phase difference between the reference signal and the vibration waveform. The phase detector is configured to adjust the output voltage in accordance with the phase difference to change electrostatic force in the capacitor for controlling the phase difference to be 90 degrees. According to the above-described configuration, the resonance frequencies of the plurality of vibrators can be caused to match with the reference signal.

The vibrator drive circuit may further include a reference signal generator configured to generate the reference signal. It is preferable that each of the plurality of vibrators is supported by a spring structure so as to be able to vibrate in a prescribed vibration direction, and the predetermined frequency is lower than a resonance frequency of each of the plurality of vibrators that is caused by the spring structure.

The vibrator drive circuit may further include a self-oscillation circuit configured to apply a prescribed drive signal to one vibrator different from the plurality of vibrators to cause the one vibrator to self-oscillate. The reference signal generator may be configured to cause a frequency of the reference signal to coincide with a frequency of the drive signal.

It is preferable that each of the plurality of vibrators and the one vibrator is supported by a spring structure so as to be able to vibrate in a prescribed vibration direction, and a resonance frequency of the one vibrator caused by the spring structure is lower than a resonance frequency of each of the plurality of vibrators that is caused by the spring structure.

In another embodiment, the present invention provides a vibrator drive circuit for driving a plurality of vibrators to vibrate in different vibration directions. The vibrator drive circuit includes a self-oscillation circuit configured to drive each of the plurality of vibrators by generating a drive signal for self-oscillating one vibrator included in the plurality of vibrators, and by applying the drive signal to the one vibrator and other vibrators of the plurality of vibrators, a capacitor formed of a movable electrode and a fixed electrode facing the movable electrode, the movable electrode being provided in each of the other vibrators and displaced together with a corresponding one of the other vibrators, a reference signal generator configured to generate a reference signal coinciding with a frequency of the drive signal based on the drive signal, and a phase detector provided in each of the other vibrators and configured to detect a vibration waveform of each of the other vibrators and apply, to the fixed electrode of the capacitor, an output voltage in accordance with a phase difference between the reference signal and the vibration waveform. The phase detector is configured to adjust the output voltage in accordance with the phase difference to change electrostatic force in the capacitor for controlling the phase difference to be 90 degrees. According to the above-described configuration, the resonance frequencies of a plurality of vibrators can be caused to coincide with the resonance frequency of one vibrator.

According to the preferred aspect of the present invention, the phase detector is configured to adjust an output voltage in accordance with the phase difference between the vibration waveform of the vibrator and the reference signal to change electrostatic force in the capacitor for controlling the phase difference to be 90 degrees. Accordingly, the resonance frequency of the vibrator can be caused to coincide with the frequency of the reference signal. Consequently, the resonance frequencies of the plurality of vibrators can be caused to coincide with the frequency of the reference signal, thereby allowing sharing of at least a part of the circuit configuration for driving a plurality of vibrators, so that the circuit scale and the power consumption can be reduced.

BRIEF DESCRIPTION OF DRAWINGS

FIG. 3 is a diagram showing a signal waveform obtained when the vibrator vibrates at a resonance frequency.

FIG. 4 is a diagram showing a signal waveform obtained when the vibrator vibrates at a frequency lower than the resonance frequency.

DESCRIPTION OF EMBODIMENTS

Figure 1:
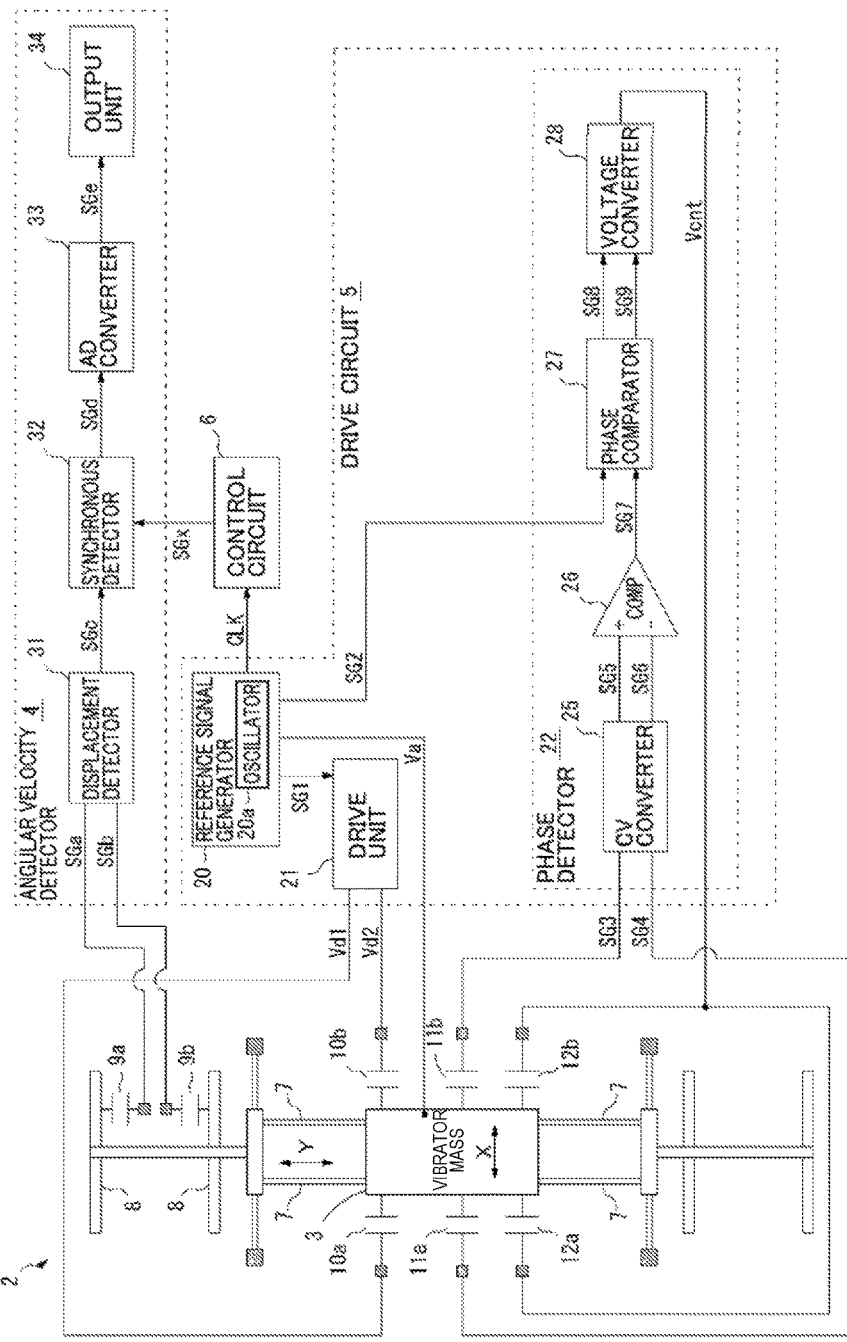
FIG. 1 is a diagram showing one configuration example of an angular velocity sensor.

Preferable embodiments according to the present invention will be hereinafter described with reference to the accompanying drawings. In the following description of the embodiments, the same components are designated by the same reference characters, and the description thereof will not be repeated.

FIG. 1 is a diagram showing an angular velocity sensor 1 in accordance with a first embodiment of the present embodiment. This angular velocity sensor 1 serves as a sensor mounted, for example, in an information processing terminal such as a smart phone or a tablet terminal. As shown in FIG. 1, angular velocity sensor 1 includes a vibrator unit 2, an angular velocity detection circuit 4, a vibrator drive circuit (which will be hereinafter simply referred to as a "drive circuit") 5, and a control circuit 6.

Vibrator unit 2 is preferably formed of an MEMS (Micro Electro Mechanical Systems) structure and includes a vibrator mass 3 that can be displaced in the X-axis and Y-axis directions. Vibrator mass 3 is supported by a spring 7 which allows it to vibrate and is driven by drive circuit 5 to vibrate in the X-axis direction. When the angular velocity is exerted while vibrator mass 3 is vibrating in the X-axis direction, Coriolis forces cause the vibrator to move in the Y-axis direction which is orthogonal to the X-axis direction. The degree of movement is a function of the angular velocity applied to the vibrator mass 3. Angular velocity sensor 1 detects displacement of vibrator mass 3 in the Y-axis direction, thereby measuring the angular velocity.

Vibrator unit 2 includes a plurality of capacitors 10a, 10b, 11a, 11b, 12a, and 12b each having a movable electrode coupled to the vibrator mass 3 and displaced together with vibrator mass 3 in the X-axis direction and a fixed electrode which is fixed on an MEMS substrate and disposed so as to face its corresponding movable electrode. The movable and fixed electrodes may be formed as a comb-shaped electrodes. Drive circuit 5 applies drive signals Vd1 and Vd2 having reversed polarities to the fixed electrodes of capacitors 10a and 10b, respectively, thereby generating electrostatic forces with different magnitudes in capacitors 10a and 10b, to cause vibrator mass 3 to vibrate in the X-axis direction. The detailed configuration and operation of drive circuit 5 will be described below.

Vibrator unit 2 includes a movable unit 8 that is displaced in the Y-axis direction in coordination with displacement of vibrator mass 3 in the Y-axis direction. Movable unit 8 is provided with capacitors 9a and 9b each for detecting the displacement of vibrator mass 3 in the Y-axis direction. Each capacitor 9a and 9b includes a movable electrode coupled to movable unit 8 and displaced together with movable unit 8 in the Y-axis direction and a fixed electrode fixed on the MEMS substrate and disposed to face its movable electrode. When the Coriolis force in the Y-axis direction is exerted on vibrator mass 3 to cause movable unit 8 to be displaced in the Y-axis direction, the capacitances of capacitors 9a and 9b are changed. When the capacitance of one capacitor 9a (or 9b) increases, the capacitance of the other capacitor 9b (or 9a) decreases. Angular velocity detection circuit 4 detects the capacitance changes in capacitors 9a and 9b and thereby detects the angular velocity acting on vibrator mass 3.

Figure 2A:
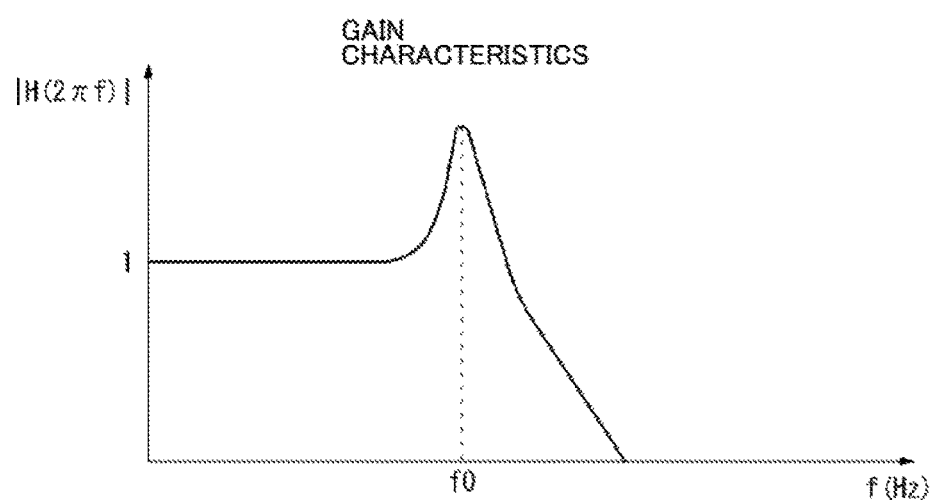
FIGS. 2(a) and 2(b) are Bode diagrams showing frequency characteristics of a vibrator.
Figure 2B:
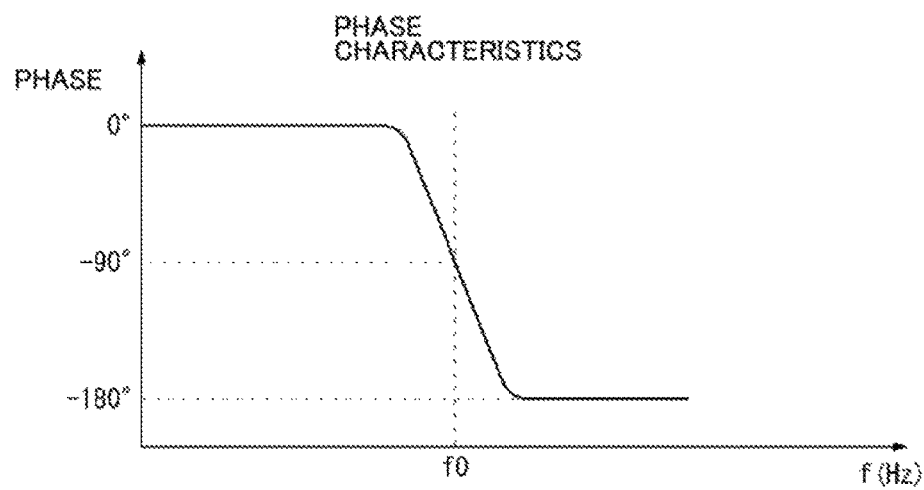

FIGS. 2(a) and 2(b) are Bode diagrams showing the frequency characteristics of vibrator mass 3. FIG. 2(a) shows gain characteristics of displacement of vibrator mass 3 in the X-direction relative to drive signals Vd1 and Vd2. FIG. 2(b) shows phase characteristics. In FIGS. 2(a) and 2(b), a resonance frequency f0 of vibrator mass 3 is expressed by the following Equation 1 wherein m is the weight of vibrator mass 3 and K is a sum of the spring constant of spring 7.

$$f0 = \frac{1}{2\pi}\sqrt{\frac{K}{m}} \quad \text{[Equation 1]}$$

As shown in FIG. 2(a), when drive circuit 5 applies drive signals Vd1 and Vd2 to vibrator mass 3 to cause vibrator mass 3 to vibrate in the X-axis direction and the drive signals Vd1 and Vd2 have frequencies coinciding with resonance frequency f0 of the vibrator (determined by weight m of vibrator mass 3 and spring constant K of spring 7), the vibration amplitude of vibrator mass 3 in the X-axis direction is maximized. Under these conditions, vibrator mass 3 vibrates with a phase delay of 90° with respect to the electrostatic force generated by drive signals Vd1 and Vd2, as shown in FIG. 2(b). On the other hand, when drive circuit 5 applies drive signals Vd1 and Vd2 having frequencies lower than resonance frequency f0 of vibrator mass 3 to cause vibrator mass 3 to vibrate, the vibration amplitude of vibrator mass 3 in the X-axis direction becomes smaller than the maximum amplitude, and the phase delay of vibrator mass 3 approaches 0°. When the frequencies of drive signals Vd1 and Vd2 are sufficiently lower than resonance frequency f0, the phase delay of vibrator mass 3 reaches 0°. Furthermore, when drive circuit 5 applies drive signals Vd1 and Vd2 having frequencies higher than resonance frequency f0 of vibrator mass 3 to cause vibrator mass 3 to vibrate, the vibration amplitude of vibrator mass 3 in the X-axis direction becomes smaller than the maximum amplitude, and the phase delay of vibrator mass 3 approaches 180°. When the frequencies of drive signals Vd1 and Vd2 are sufficiently higher than resonance frequency f0, the phase delay of vibrator mass 3 reaches 180°. Therefore, by detecting the phase delay of vibrator mass 3, it can be determined whether or not vibrator mass 3 vibrates at resonance frequency f0.

According to drive circuit 5 in the present embodiment, in consideration that vibrator mass 3 vibrates with a shift delay of 90° with respect to the electrostatic force acting on vibrator mass 3 when vibrator mass 3 vibrates at a resonance frequency, vibrator mass 3 is driven while shifting the resonance frequency of vibrator mass 3 such that the phase delay of vibrator mass 3 is set at 90°, which will be hereinafter described in detail.

Drive circuit 5 includes a reference signal generator 20, a drive unit 21, and a phase detector 22, as shown in FIG. 1. Reference signal generator 20 includes, for example, an oscillator 20a configured to generate a high frequency signal. Reference signal generator 20 divides the high frequency signal generated by oscillator 20a to generate reference signals SG1 and SG2 of predetermined frequencies. Reference signal SG2 is equal in frequency to reference signal SG1 and delayed in phase by 90° with respect to reference signal SG1. Reference signal generator 20 outputs reference signal SG1 to drive unit 21, and outputs reference signal SG2 to phase detector 22. Reference signal generator 20 applies a fixed voltage Va to vibrator mass 3. Based on reference signal SG1, drive unit 21 generates a pair of drive signals Vd1 and Vd2 that are preferably provided as sine wave signals each coinciding with the frequency of reference signal SG1 but which have polarities reversed to each other (i.e., have opposite polarities). Drive unit 21 applies these drive signals Vd1 and Vd2 to fixed electrodes of capacitors 10a and 10b, respectively. Voltage Va of vibrator mass 3 is maintained, for example, at or above the maximum voltage of each of drive signals Vd1 and Vd2. Since drive signals Vd1 and Vd2 having opposite polarities are applied to capacitors 10a and 10b, respectively, they generate an electrostatic force F that causes vibrator mass 3 to vibrate in the X-axis direction.

When vibrator mass 3 vibrates in the X-axis direction, the capacitances of capacitors 11a and 11b change. Specifically, when the capacitance of one capacitor 11a (or 11b) increases, the capacitance of the other capacitor 11b (or 11a) decreases. Phase detector 22 detects the vibration waveform of vibrator mass 3 in the X-axis direction based on the capacitance changes of these capacitors 11a and 11b, and generates an output voltage Vcnt in accordance with the phase difference between this vibration waveform and reference signal SG1, to apply this output voltage Vcnt to the fixed electrodes of capacitors 12a and 12b, thereby changing the electrostatic force in each of capacitors 12a and 12b to control the phase difference between the vibration waveform of vibrator mass 3 and reference signal SG1 to be 90 degrees.

Phase detector 22 includes a CV converter 25, a comparator 26, a phase comparator 27, and a voltage converter 28. CV converter 25 converts, into voltages, charge signals SG3 and SG4 transferred from capacitors 11b and 11a, respectively, in accordance with capacitance changes in capacitors 11a and 11b. Then, CV converter 25 outputs a pair of signals SG5 and SG6 that have opposite polarities and that each show a vibration waveform of vibrator mass 3 in the X-axis direction. Comparator 26 compares this pair of signals SG5 and SG6, and outputs a pulse signal SG7. The polarity of pulse signal SG7 is reversed at the timing at which the magnitude relation between SG5 and SG6 is reversed. Phase comparator 27 performs a phase comparison between pulse signal SG7 and reference signal SG2 output from reference signal generator 20. If there is a phase shift between pulse signal SG7 and reference signal SG2, phase comparator 27 outputs pulse signals SG8 and SG9 each having a pulse width indicative of this phase shift. In other words, since reference signal SG2 is delayed in phase by 90° with respect to reference signal SG1, phase comparator 27 performs a phase comparison between pulse signal SG7 and reference signal SG2, thereby detecting whether or not the phase delay of vibrator mass 3 driven by drive signals Vd1 and Vd2 reaches 90°. If the phase delay of vibrator mass 3 does not reach 90°, phase comparator 27 outputs pulse signals SG8 and SG9 each having a pulse width in accordance with the amount of phase shift from 90°. Pulse signal SG8 is output as a pulse width in accordance with the positional displacement between the leading edges of reference signal SG2 and pulse signal SG7 when the leading edge of pulse signal SG7 is forwardly of the leading edge of reference signal SG2. On the other hand, pulse signal SG9 is output as a pulse width in accordance with the positional displacement between the leading edges of pulse signal SG7 and reference signal SG2 when the leading edge of pulse signal SG7 is rearward of the leading edge of reference signal SG2. Voltage converter 28 integrates the pulse widths of pulse signals SG8 and SG9 and converts the integrated result into a voltage to generate an output voltage Vcnt. Voltage converter 28 applies this output voltage Vcnt to the fixed electrodes of capacitors 12a and 12b.

FIG. 3 is a diagram showing the signal waveforms output by various components of FIG. 1 when drive circuit 5 causes vibrator mass 3 to vibrate at a resonance frequency. As shown in FIG. 3, when the frequency f of reference signal SG1 coincides with resonance frequency f0 of vibrator mass 3, capacitors 10a and 10b receive drive signals Vd1 and Vd2, respectively, that coincide with resonance frequency f0. As a result, an electrostatic force F that changes periodically in accordance with resonance frequency f0 is exerted on vibrator mass 3 to cause vibrator mass 3 to vibrate in the X-axis direction. The phase of this electrostatic force F coincides with the phases of drive signals Vd1 and Vd2 and also coincides with the phase of reference signal SG1. When vibrator mass 3 is driven at resonance frequency f0 it vibrates in the X-axis direction with a phase delay of 90° with respect to the phase of electrostatic force F. Accordingly, as shown in FIG. 3, a pair of signals SG5 and SG6, each indicating the vibration waveform of vibrator mass 3 and output from CV converter 25, are output as a signal with a shift delay of 90° with respect to drive signals Vd1, Vd2 and the reference signal SG1. When signals SG5 and SG6 are converted into a pulse signal SG7 by comparator 26, this pulse signal SG7 is in phase with reference signal SG2 (which is out of phase with reference signal SG1 by 90°). Therefore, when vibrator mass 3 vibrates at a resonance frequency, phase comparator 27 does not detect a phase shift between pulse signal SG7 and reference signal SG2. Accordingly, pulse width W of each of pulse signals SG8 and SG9 is 0.

FIG. 4 is a diagram showing the signal waveforms output by various components of FIG. 1 when drive circuit 5 drives vibrator mass 3 at a frequency lower than the resonance frequency. When frequency f of reference signal SG1 is lower than resonance frequency f0 of vibrator mass 3, capacitors 10a and 10b receive drive signals Vd1 and Vd2, respectively, that coincide with frequency f of reference signal SG1. As a result, vibrator mass 3 receives an electrostatic force F that changes periodically in accordance with frequency f of reference signal SG1 and causes vibrator mass 3 to vibrate in the X-axis direction at that frequency. The phase of this electrostatic force F coincides with the phases of drive signals Vd1 and Vd2 and also coincides with the phase of reference signal SG1. When vibrator mass 3 is driven at frequency f lower than resonance frequency f0, the phase delay of vibrator mass 3 with respect to electrostatic force F is not 90°, but equal to or greater than 0° and less than 90°. Accordingly, the pair of signals SG5 and SG6 output from CV converter 25 (and each indicating a vibration waveform of vibrator mass 3) have a shift delay with respect to drive signals Vd1, Vd2 and reference signal SG1 in the range of 0° or more and less than 90°. When signals SG5 and SG6 are converted into pulse signal SG7 by comparator 26, pulse signal SG7 is not in phase with reference signal SG2, and the leading and trailing edge positions of pulse signal SG7 occur at timings that are forwardly of the leading and trailing edge positions of reference signal SG2, respectively. Phase comparator 27 outputs a pulse signal SG8 having pulse width W which varies as a function of the amount of displacement between these leading and trailing edge positions. Pulse signal SG9 is not output at this time.

On the other hand, when vibrator mass 3 starts to vibrate at a frequency higher than the resonance frequency, the edge position relation between reference signal SG2 and pulse signal SG7 that is output from comparator 26 is reversed from the above-described relation. In other words, the leading and trailing edge positions of pulse signal SG7 occur later in timing than the leading and trailing edge positions of reference signal SG2, respectively. In this case, phase comparator 27 is to output pulse signal SG9 having pulse width W in accordance with the amount of such displacement between the edge positions, so that pulse signal SG8 is not output.

Figure 5A:
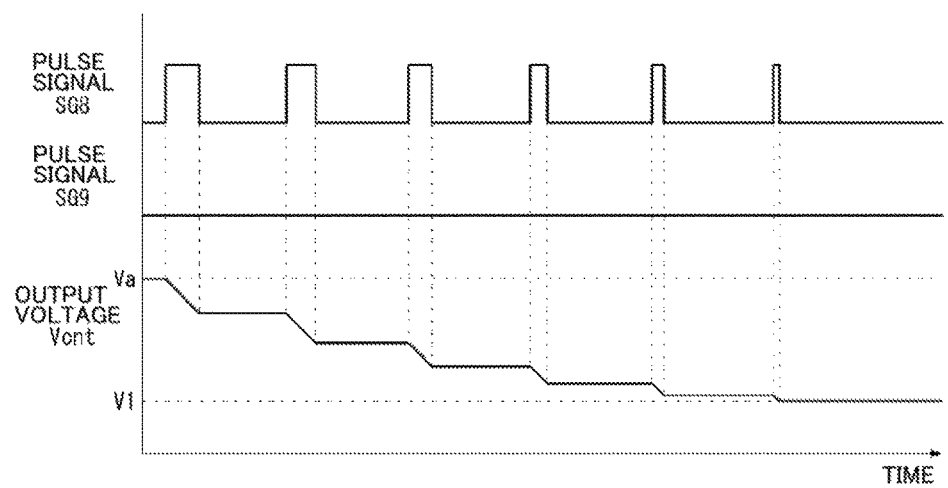
FIGS. 5(a) and 5(b) are diagrams showing an example in which a pulse width is converted into an output voltage in a voltage converter.
Figure 5B:
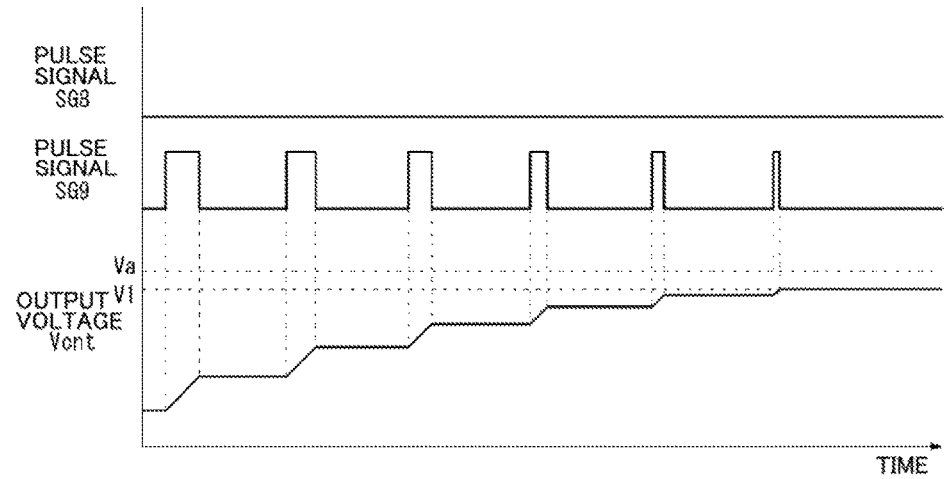

FIGS. 5(a) and 5(b) are diagrams showing an example in which the pulse width W of each of pulse signals SG8 and SG9 is converted into output voltage Vcnt by voltage converter 28. For example, as shown in FIG. 5(a), voltage converter 28 initially outputs an output voltage Vcnt that coincides with voltage Va of vibrator mass 3 in the initial state. However, output initial voltage Vcnt does not have to coincide with voltage Va of vibrator mass 3, but may fall within a range of 0 to Va. When the initial pulse signal SG8 is output from phase comparator 27 as shown in FIG. 5(a), voltage converter 28 lowers output voltage Vcnt in accordance with the pulse width of pulse signal SG8, and maintains the output voltage Vcnt at that level until a new pulse is received. Each time voltage converter 28 receives pulse signal SG8 it lowers output voltage Vcnt by an amount determined by the width of the received pulse. When vibrator mass 3 starts to vibrate at a resonance frequency while output voltage Vcnt is V1, pulse signal SG8 is no longer output, so that output voltage Vcnt is kept at a fixed level.

As shown in FIG. 5(b), when the initial output voltage Vcnt is lower than voltage Va and the initial pulse of pulse signal SG9 is received from phase comparator 27, voltage converter 28 raises the output voltage Vcnt by an amount determined by the width of the initial pulse and maintains the raised output voltage Vcnt at the raised level until the next pulse is received. Then, each time voltage converter 28 receives another pulse of pulse signal SG9, it raises the output voltage Vcnt by an amount determined by the width of the received pulse. When vibrator mass 3 starts to vibrate at a resonance frequency while output voltage Vcnt is V1, the pulse signal SG9 is no longer output, so that output voltage Vcnt is maintained at a fixed level.

When the pulse width of each of pulse signals SG8 and SG9 output from phase comparator 27 reaches 0, voltage converter 28 maintains output voltage Vcnt at a fixed level. Therefore, when vibrator mass 3 does not vibrate at a resonance frequency, output voltage Vcnt of voltage converter 28 is appropriately adjusted to be lower than voltage Va of vibrator mass 3, and the potential difference between the movable electrode and the fixed electrode of each of capacitors 12a and 12b is adjusted to be a prescribed voltage. When vibrator mass 3 starts to vibrate at a resonance frequency, output voltage Vcnt of voltage converter 28 is kept at a fixed level.

When the potential difference occurs between the movable electrode and the fixed electrode, capacitors 12*a* and 12*b* each thereby apply a negative spring constant (−Ke) to vibrator mass 3 in a pseudo manner. Specifically, assuming that the potential difference between the movable electrode and the fixed electrode is defined as V and the capacitance of each of capacitors 12*a* and 12*b* is defined as C, energy W of each of capacitors 12*a* and 12*b* is expressed by the following Equation 2.

$$W = \frac{1}{2}CV^2 \quad \text{[Equation 2]}$$

Furthermore, based on the above Equation 2, the electrostatic force Fe acting between the movable electrode and the fixed electrode of each of capacitors 12*a* and 12*b* is expressed by the following Equation 3 wherein x is the displacement of the movable electrode.

$$Fe = \frac{dW}{dx} = \frac{1}{2}V^2\frac{dC}{dx} \quad \text{[Equation 3]}$$

Since the spring constant (−Ke) is calculated by differentiating the force acting on vibrator mass 3 with a displacement x, the following Equation 4 is obtained based on the above-mentioned Equation 3. Equation 4 is an approximate equation which assumes that displacement x of the movable electrode is sufficiently smaller than a distance D between the movable electrode and the fixed electrode. In addition, C0 in the Equation 4 is an initial capacitance value obtained when the movable electrode is located at the initial position.

$$-Ke = \frac{dFe}{dx} = \frac{1}{2}V^2\frac{d^2C}{dx^2} \approx \frac{V^2 C_0}{D^2} \quad \text{[Equation 4]}$$

It is apparent from Equation 4 that phase detector 22 causes a potential difference V (=Va−Vcnt) to occur between the movable electrode and the fixed electrode of each of capacitors 12*a* and 12*b*, so that a negative spring constant (−Ke) can be applied to vibrator mass 3 in a pseudo manner.

Figure 6:
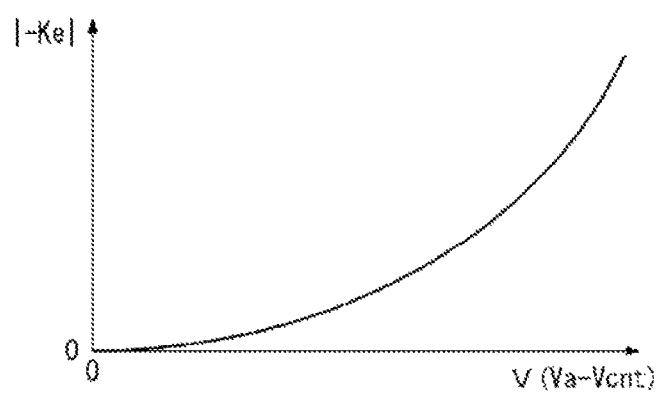
FIG. 6 is a diagram showing the relation between a potential difference and an absolute value of a spring constant.

FIG. 6 is a diagram showing the relation between potential difference V and an absolute value of the spring constant (−Ke). As shown in FIG. 6, when potential difference Va−Vcnt is 0, the absolute value of the spring constant (−Ke) applied to vibrator mass 3 by capacitors 12*a* and 12*b* is 0. In contrast, when potential difference Va−Vcnt increases, the absolute value of the spring constant (−Ke) applied to vibrator mass 3 by capacitors 12*a* and 12*b* increases by the quadratic function of this potential difference Va−Vcnt. Specifically, by adjusting potential difference V (=Va−Vcnt) between the movable electrode and the fixed electrode of each of capacitors 12*a* and 12*b*, the negative spring constant (−Ke) applied to vibrator mass 3 can be changed as appropriate. In addition, although the above-mentioned Equation 4 is applied in the case where capacitors 12*a* and 12*b* are formed of parallel plates, capacitors 12*a* and 12*b* each may be formed of a structure other than such a parallel plate as long as ($d^2C/dx^2$) can be assumed to be constant.

When a negative spring constant (−Ke) is applied to vibrator mass 3, the resonance frequency of vibrator mass 3 is shifted. In other words, assuming that the resonance frequency of vibrator mass 3 in the state where the negative spring constant (−Ke) is applied to vibrator mass 3 is defined as f1, this resonance frequency f1 is expressed by the following equation 5.

$$f1 = \frac{1}{2\pi}\sqrt{\frac{K - Ke}{m}} \quad \text{[Equation 5]}$$

Figure 7:
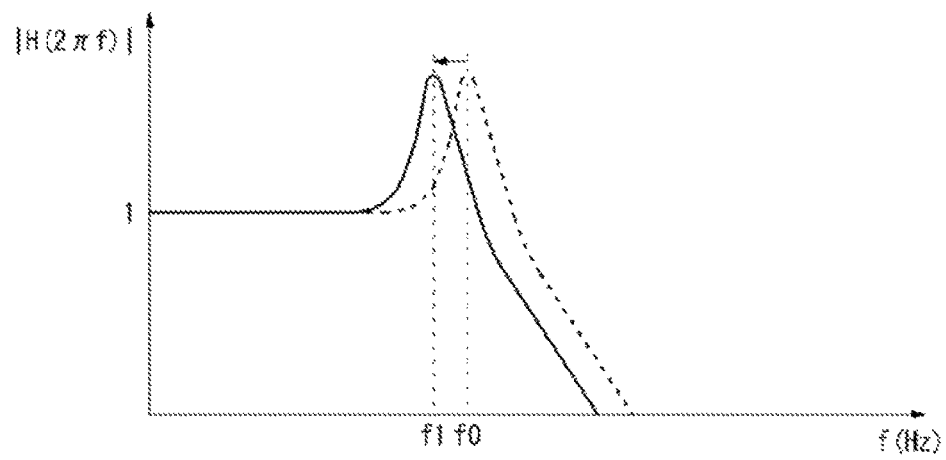
FIG. 7 is a diagram showing a shift concept of the resonance frequency of the vibrator.

FIG. 7 is a diagram showing a shift concept of the resonance frequency of vibrator mass 3. Phase detector 22 applies output voltage Vcnt to capacitors 12*a* and 12*b*, in accordance with the phase difference between the vibration waveform of vibrator mass 3 and reference signal SG2 to cause potential difference V to occur between the fixed electrode and the movable electrode. Thereby, the resonance frequency of vibrator mass 3 is shifted to frequency f1 which is lower than the original resonance frequency f0 as shown in FIG. 7. Therefore, if reference signal generator 20 is configured to previously generate and output reference signal SG1 of frequency f1 lower than original resonance frequency f0 of vibrator mass 3, phase detector 22 adjusts output voltage Vcnt to be lowered or raised such that the phase difference between the vibration waveform of vibrator mass 3 and reference signal SG1 is set at 90°, thereby allowing the resonance frequency of vibrator mass 3 to coincide with frequency f1 of reference signal SG1. In other words, in the state where pulse signal SG8 is output, output voltage Vcnt gradually lowers, so that the resonance frequency of vibrator mass 3 lowers. When the resonance frequency of vibrator mass 3 lowers below frequency f1 of reference signal SG1, pulse signal SG9 is output, so that output voltage Vcnt is raised to thereby raise the resonance frequency of vibrator mass 3. By such feedback, the resonance frequency of vibrator mass 3 can be caused to coincide with frequency f1 of reference signal SG1. When the resonance frequency of vibrator mass 3 is caused to coincide with frequency f1 of reference signal SG1, the phase delay of vibrator mass 3 reaches 90° and the pulse width of each of pulse signals SG8 and SG9 output from phase comparator 27 reaches 0. Thereby, phase detector 22 is to keep output voltage Vcnt at this point of time, which allows vibrator mass 3 to vibrate stably at resonance frequency f1 in the X-axis direction. At this time, the vibration amplitude of vibrator mass 3 shows the maximum amplitude and the vibration velocity in the X-axis direction is also at the maximum. Accordingly, the Coriolis force that acts on vibrator mass 3 is increased in accordance with the angular velocity, so that it becomes possible to increase the amount of displacement of vibrator mass 3 in the Y-axis direction caused by the Coriolis force.

Angular velocity detection circuit 4 includes a displacement detector 31 configured to detect a vibration waveform of vibrator mass 3 that vibrates while being displaced in the Y-axis direction by the Coriolis force, a synchronous detector 32 configured to detect the vibration waveform of the Coriolis force component from the vibration waveform of vibrator mass 3 in the Y-axis direction detected by displacement detector 31; an AD converter 33 configured to AD-convert the vibration waveform of the Coriolis force component detected by synchronous detector 32, and an output unit 34 configured to output a digital signal generated by AD converter 33. In accordance with displacement of vibrator mass 3 in the Y-axis direction, displacement detector 31 CV-converts charge signals SGa and SGb transferred from capacitors 9a and 9b to output a signal SGc indicating the vibration waveform of vibrator mass 3 in the Y-axis direction. Signal SGc includes not only a signal component of the vibration waveform caused by the Coriolis force but also a signal component of the vibration waveform caused by a quadrature error. It is known that the vibration waveform caused by the Coriolis force and the vibration waveform caused by the quadrature error are shifted in phase by 90°. In order to allow extraction of only the signal component of the vibration waveform caused by the Coriolis force by utilizing this phase shift, based on a clock signal CLK output from reference signal generator 20, control circuit 6 generates a synchronous detection signal SGx for extracting only the signal component having a vibration waveform caused by the Coriolis force. This synchronous detection signal SGx is in synchronization with reference signals SG1 and SG2. Control circuit 6 outputs this synchronous detection signal SGx to synchronous detector 32. Based on synchronous detection signal SGx output from control circuit 6, synchronous detector 32 detects and extracts, from signal SGc, only the signal component that is in synchronization with the vibration waveform caused by the Coriolis force, thereby outputting a signal SGd showing the vibration waveform of the Coriolis force component. Thereby, the signal component of the vibration waveform caused by an unnecessary quadrature error is removed from signal SGc showing the vibration waveform of vibrator mass 3 in the Y-axis direction. Accordingly, it becomes possible to accurately detect the amount of displacement of vibrator mass 3 in the Y-axis direction caused by the Coriolis force. Furthermore, drive circuit 5 causes vibrator mass 3 to vibrate at the resonance frequency f1, thereby increasing the amount of displacement of vibrator mass 3 in the Y-axis direction caused by the Coriolis force. Consequently, angular velocity detection circuit 4 can detect the amount of displacement caused by the Coriolis force in the Y-axis direction with high sensitivity.

In the case where a plurality of vibrators 3 are mounted in angular velocity sensor 1, the above-described drive circuit 5 allows the resonance frequencies of the plurality of vibrators 3 to be adjusted to be the same frequency, and also allows each of reference signal generator 20 and drive unit 21 to be shared among the plurality of vibrators 3, which will be hereinafter described in detail.

Figure 8:
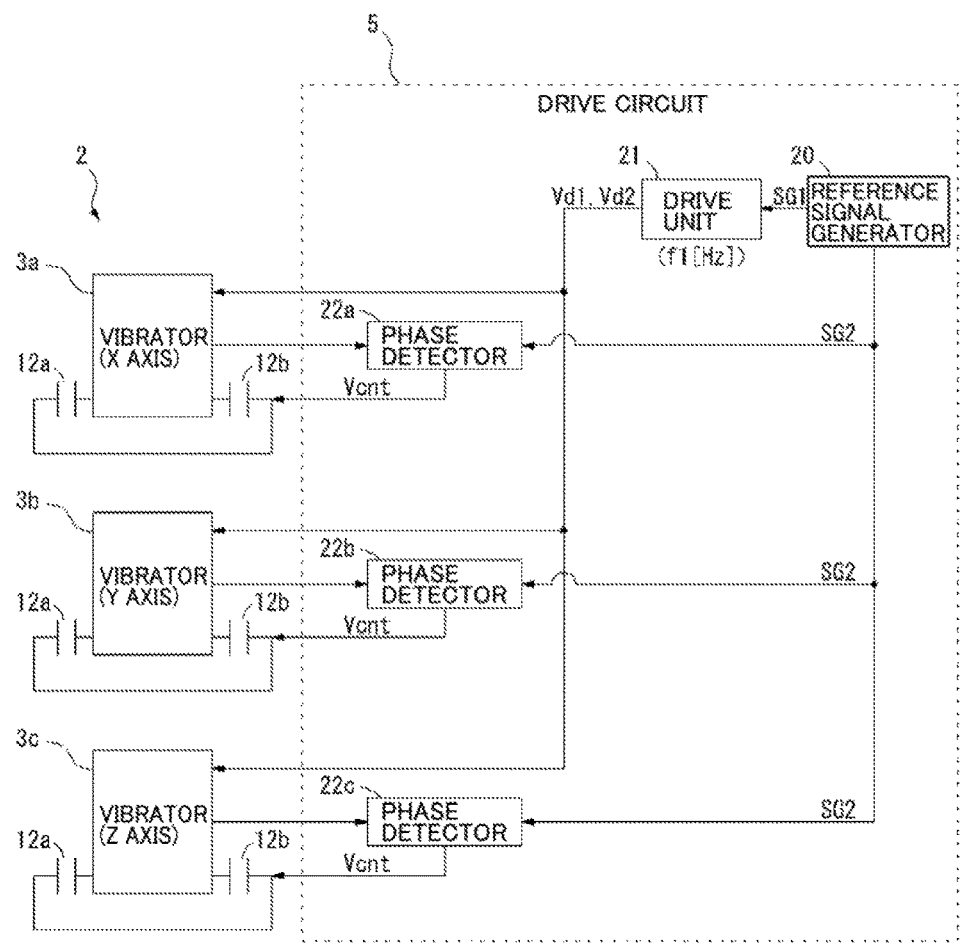
FIG. 8 is one configuration example of a drive circuit configured to drive a plurality of vibrators.

FIG. 8 is one configuration example of drive circuit 5 configured to drive a plurality of vibrators 3a, 3b and 3c. Vibrator unit 2 includes a plurality of vibrators 3a, 3b and 3c that vibrate in, for example, three orthogonal directions (x, y and z). Although FIG. 8 shows each of vibrators 3a, 3b and 3c in a simplified manner, the actual structure of the vibrators is preferably the same as that shown in FIG. 1. Drive circuit 5 drives the vibrators 3a, 3b and 3c in their respective vibration directions and includes a single reference signal generator 20 and a single drive unit 21. It also includes phase detectors 22a, 22b and 22c separately provided for the plurality of vibrators 3a, 3b and 3c, respectively. When drive circuit 5 is not operating, vibrators 3a, 3b and 3c have different resonance frequencies, that is, resonance frequencies fa, fb and fc, respectively. Each of vibrators 3a and 3c is supported by the structure of a respective spring 7 designed in advance such that these resonance frequencies fa, fb and fc are higher than frequency f1 of reference signal SG1 generated in reference signal generator 20.

Reference signal generator 20 generates reference signal SG1 having a predetermined frequency f1 that is lower than resonance frequencies fa, fb and fc of vibrators 3a, 3b and 3c, and outputs this reference signal SG1 to drive unit 21. Reference signal generator 20 also generates reference signal SG2 with a shift delay of 90° with respect to reference signal SG1 and outputs this reference signal SG2 to phase detectors 22a, 22b and 22c coupled to vibrators 3a, 3b and 3c, respectively. Based on reference signal SG1, drive unit 21 generates drive signals Vd1 and Vd2 each having predetermined frequency f1, and applies these drive signals Vd1 and Vd2 to each of the vibrators 3a, 3b and 3c. This causes the plurality of vibrators 3a, 3b and 3c to vibrate in respective vibration directions that are orthogonal to one another. However, since the frequency f1 of each of drive signals Vd1 and Vd2 is lower than resonance frequencies fa, fb and fc of vibrators 3a, 3b and 3c, these vibrators 3a, 3b and 3c vibrate at a frequency lower than their respective resonance frequencies fa, fb and fc.

Figure 9:
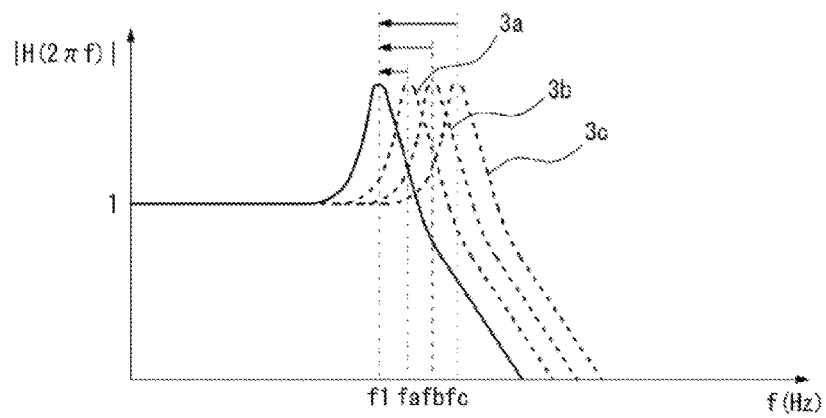
FIG. 9 is a diagram showing an example in which resonance frequencies of the plurality of vibrators are shifted to a prescribed frequency.

Phase detectors 22a, 22b and 22c coupled to respective vibrators 3a, 3b and 3c, preferably have the same configuration as that of phase detector 22 shown in FIG. 1. When vibrator mass 3a vibrates in a prescribed vibration direction in response to drive signals Vd1 and Vd2, phase detector 22a generates an output voltage Vcnt such that the vibration waveform is delayed in phase by 90° with respect to drive signals Vd1 and Vd2 and applies this output voltage Vcnt to capacitors 12a and 12b of vibrator mass 3a. Furthermore, when vibrator mass 3b vibrates in the prescribed vibration direction in response to drive signals Vd1 and Vd2, phase detector 22b generates output voltage Vcnt such that the vibration waveform is delayed in phase by 90° with respect to drive signals Vd1 and Vd2 and applies this output voltage Vcnt to capacitors 12a and 12b of vibrator mass 3b. Finally, when vibrator mass 3c vibrates in the prescribed vibration direction in response to drive signals Vd1 and Vd2, phase detector 22c generates output voltage Vcnt such that the vibration waveform is delayed in phase by 90° with respect to drive signals Vd1 and Vd2 and applies this output voltage Vcnt to capacitors 12a and 12b of vibrator mass 3c. As a result, the resonance frequencies of vibrators 3a, 3b and 3c are shifted to coincide with frequency f1 of drive signals Vd1 and Vd2, as shown in FIG. 9 causing vibrators 3a, 3b and 3c to vibrate at the same resonance frequency f1. Furthermore, the phase achieved by vibration of each of vibrators 3a, 3b and 3c is delayed by 90° with respect to the phases of drive signals Vd1 and Vd2, and the vibration waveforms of vibrators 3a, 3b and 3c are in synchronization with one another. Thereby, control circuit 6 (FIG. 1) can output a synchronous detection signal SGx that is shared among respective angular velocity detection circuits 4 separately provided for each of the vibrators 3a, 3b and 3c. Accordingly, the reference signal generator 20, the drive unit 21 and the control circuit 6 can be implemented as a circuit shared among the plurality of vibrators 3a, 3b and 3c.

Drive circuit 5 shown in FIG. 8 causes the resonance frequencies of the plurality of vibrators 3a, 3b and 3c to coincide with one another, thereby allowing at least a part of the circuit configuration to be shared among vibrators 3a, 3b and 3c, so that the circuit scale can be reduced. By reducing the circuit scale in this way, angular velocity sensor 1 can be relatively easily reduced in size while power consumption of angular velocity sensor 1 can also be reduced.

Figure 10:
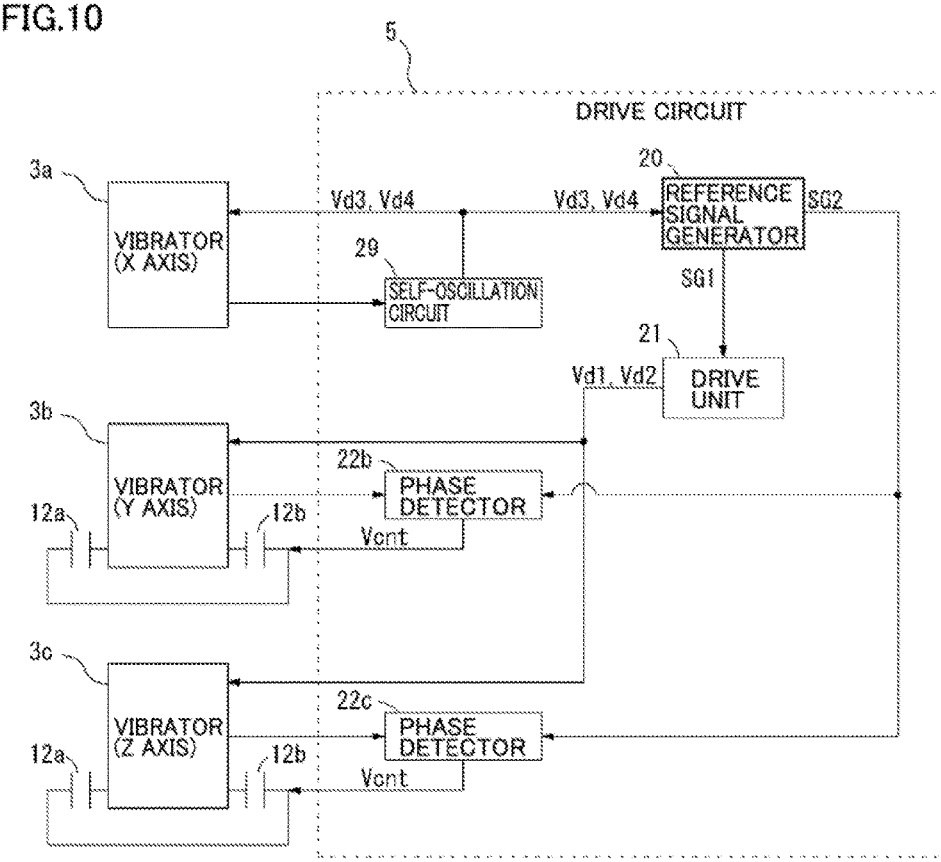
FIG. 10 is a diagram showing another configuration example of a drive circuit configured to drive a plurality of vibrators.

FIG. 10 shows a configuration example of drive circuit 5 different from that shown in FIG. 8. Drive circuit 5 shown in FIG. 10 has a circuit configuration in which the lowest frequency among resonance frequencies fa, fb and fc of vibrators 3a, 3b and 3c is set as a reference frequency with which other resonance frequencies are adjusted to coincide.

Each of vibrators 3a, 3b and 3c is supported by a respective structure of spring 7 designed in advance such that resonance frequency fa of vibrator mass 3a is set to be lower than the resonance frequencies fb and fc of vibrators 3b and 3c. Also, drive circuit 5 includes a self-oscillation circuit 29 configured to cause vibrator mass 3a to vibrate by self-oscillation, a reference signal generator 20 configured to generate reference signal SG1 that is in synchronization with drive signals Vd3 and Vd4 from self-oscillation circuit 29, a drive unit 21 configured to drive the other two vibrators 3b and 3c, and respective phase detectors 22b and 22c separately provided for vibrators 3b and 3c.

Drive circuit 5 causes self-oscillation circuit 29 to operate to feed-back drive signals Vd3 and Vd4 to vibrator mass 3a so as to cause vibrator mass 3a to vibrate at a resonance frequency fa in a prescribed vibration direction. Based on drive signal Vd3, reference signal generator 20 generates a reference signal SG1 having the same frequency fa as that of drive signal Vd3 and outputs this reference signal SG1 to drive unit 21. Reference signal SG1 is identical in phase to drive signal Vd3. Also, reference signal generator 20 generates a reference signal SG2 with a shift delay of 90° with respect to reference signal SG1 and outputs this reference signal SG2 to each of phase detectors 22b and 22c. Based on the reference signal SG1, drive unit 21 generates drive signals Vd1 and Vd2 that coincide with resonance frequency fa of vibrator mass 3a, and applies these drive signals Vd1 and Vd2 to each of other two vibrators 3b and 3c. This causes vibrators 3a, 3b and 3c to vibrate in the vibration directions that are orthogonal to one another. However, since frequency fa of each of drive signals Vd1 and Vd2 is lower than resonance frequencies fb and fc of vibrator mass 3b and 3c, respectively, vibrators 3b and 3c vibrate at a frequency lower than resonance frequencies fb and fc, respectively.

Figure 11:
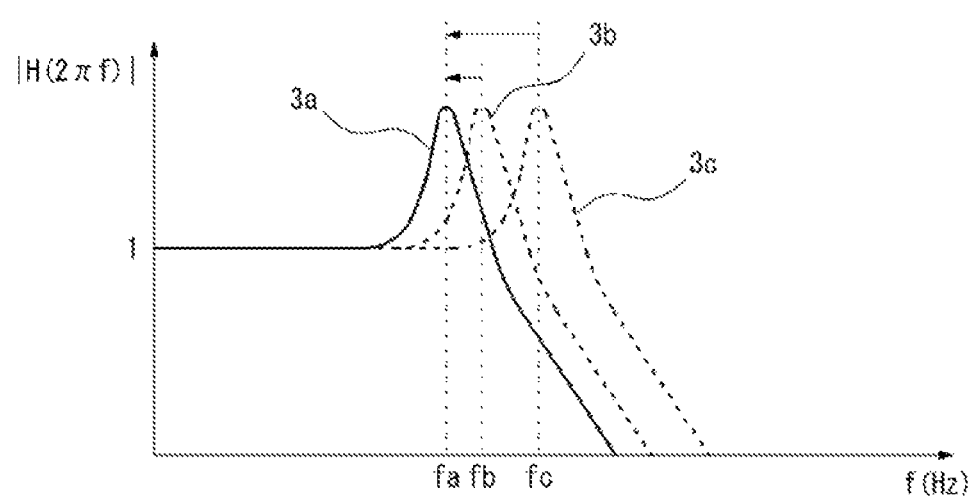
FIG. 11 is a diagram showing an example in which resonance frequencies of other vibrators are shifted to align with the resonance frequency of one vibrator.

When vibrators 3b and 3c vibrate in prescribed vibration directions by drive signals Vd1 and Vd2, phase detectors 22b and 22c provided for vibrators 3b and 3c, respectively, generate output voltage Vcnt such that the vibration waveform is delayed in phase by 90° with respect to drive signals Vd1 and Vd2, and then, apply this output voltage Vcnt to capacitors 12a and 12b in each of vibrators 3b and 3c. Thereby, the resonance frequencies of vibrators 3b and 3c are shifted so as to coincide with frequency fa of drive signals Vd1 and Vd2, as shown in FIG. 11. This consequently causes the vibrators 3a, 3b and 3c to vibrate at the same resonance frequency fa. Furthermore, the phase achieved by vibration of each of vibrators 3a, 3b and 3c is delayed by 90° with respect to the phases of drive signals Vd3, Vd4, Vd1, and Vd2, and the vibration waveforms of vibrators 3a, 3b and 3c are brought into synchronization with one another. As a result, control circuit 6 outputs a single synchronous detection signal SGx that is shared among the respective angular velocity detection circuits 4 provided for vibrators 3a, 3b and 3c.

Drive circuit 5 shown in FIG. 10 causes the resonance frequencies of the vibrators 3a, 3b and 3c to coincide with one another, thereby allowing at least a part of the circuit configuration to be shared and used among vibrators 3b and 3c, so that the circuit scale can be reduced. By reducing the circuit scale in this way, angular velocity sensor 1 can be relatively easily reduced in size while power consumption of angular velocity sensor 1 can also be reduced. In drive circuit 5 shown in FIG. 10, since reference signal generator 20 generates reference signal SG1 based on drive signal Vd3, oscillator 20a as shown in FIG. 1 does not have to be particularly provided.

Figure 12:
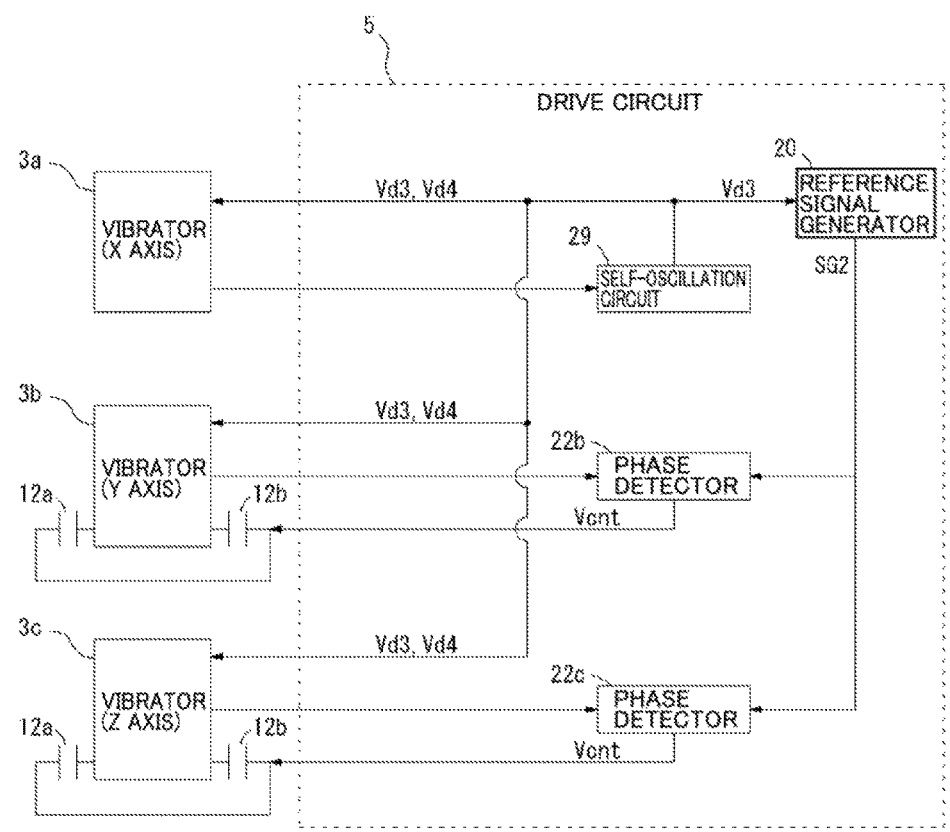
FIG. 12 is a diagram showing still another configuration example of a drive circuit configured to drive a plurality of vibrators.

FIG. 12 is a diagram showing a configuration example in which drive unit 21 is further omitted from drive circuit 5 shown in FIG. 10. In the drive circuit 5 shown in FIG. 12, drive signals Vd3 and Vd4 output from self-oscillation circuit 29 of vibrator mass 3a are applied to each of the plurality of vibrators 3a, 3b and 3c. This causes each of vibrators 3a, 3b and 3c to vibrate at a resonance frequency fa of vibrator mass 3a, thereby causing vibrators 3b and 3c to vibrate at a frequency lower than their resonance frequencies fb and fc, respectively. When vibrators 3b and 3c vibrate in a prescribed vibration direction as a function of drive signals Vd3 and Vd4, respective phase detectors 22b and 22c generate respective output voltages Vcnt such that the vibration waveform is delayed in phase by 90° with respect to each of drive signals Vd3 and Vd4. Phase detector 22b applies the generated output voltage Vcnt to capacitors 12a and 12b associated with vibrator mass 3b while phase detector 22c applies the generated output voltage Vcnt to capacitors 12a and 12b associated with vibrator mass 3c. Thereby, the resonance frequencies of vibrators 3b and 3c are shifted so as to coincide with frequency fa of drive signals Vd3 and Vd4, as shown in FIG. 11. This consequently causes all three vibrators 3a, 3b and 3c to vibrate at the same resonance frequency fa. Therefore, drive circuit 5 shown in FIG. 12 is advantageous in that it can be simplified in configuration while exhibiting the carrying out the same functions and achieving the same effects as those described above.

Drive circuit 5 having been described above in the present embodiment includes a drive unit 21 configured to drive a vibrator mass 3 based on a reference signal SG1 having a predetermined frequency to cause vibrator mass 3 to vibrate in a vibration direction, a phase detector 22 configured to detect a vibration waveform of vibrator mass 3 in the vibration direction and to output an output voltage Vcnt in accordance with a phase difference between the vibration waveform and a reference signal SG1, capacitors 12a and 12b each having a movable electrode provided in vibrator mass 3 and a fixed electrode facing the movable electrode, in which output voltage Vcnt is applied to the fixed electrode. Phase detector 22 is configured to adjust output voltage Vcnt in accordance with the phase difference between the vibration waveform of vibrator mass 3 and reference signal SG1, thereby changing the electrostatic force in capacitors 12a and 12b for controlling the phase difference to be 90 degrees. According to such a configuration, the resonance frequency of vibrator mass 3 that is vibrating in the vibration direction can be shifted to the frequency of reference signal SG1 while vibrator mass 3 can be caused to vibrate at the shifted resonance frequency. Such drive circuit 5 is used to thereby allow the resonance frequencies of a plurality of vibrators 3a, 3b and 3c to coincide with one another, so that each of the vibrators does not have to be separately driven. This leads to an advantage that at least a part of the circuit configuration for driving each of the plurality of vibrators 3a, 3b and 3c can be shared so as to reduce the circuit scale.

Although embodiments of the present invention has been described above, the present invention is not limited to the features described above and various modifications can be applicable thereto.

For example, an explanation has been given in an above-described embodiment with regard to the point that at least a part of the circuit configuration can be shared when drive circuit 5 drives a plurality of vibrators 3a, 3b and 3c. However, the above-described drive circuit 5 is not a circuit that is available only for driving a plurality of vibrators 3a, 3b and 3c. In other words, the above-described drive circuit 5 is advantageous in that it can be applicable also for driving one vibrator mass 3, and that the resonance frequency of this one vibrator mass 3 can be adjusted to coincide with a predetermined frequency by signal processing.

REFERENCE SIGNS LIST 1 angular velocity sensor, 2 sensor unit, 3, 3a, 3b, 3c vibrator, 4 angular velocity detection circuit, 5 drive circuit (vibrator drive circuit), 6 control circuit, 7 spring, 8 movable unit, 20 reference signal generator, 21 drive unit, 22 phase detector, 29 self-oscillation circuit, 9a, 9b, 10a, 10b, 11a, 11b, 12a, 12b capacitor, SG1, SG2 reference signal, Vcnt output voltage.

The invention claimed is:

1. A combination, comprising:
a vibrator comprising a vibrator mass which is free to vibrate in first and second orthogonal directions;
a signal generator for generating a drive signal which is applied to the vibrator and causes the vibrator mass to vibrate in the first direction;
at least one phase adjusting capacitor coupled to the vibrator mass and serving to adjust the phase of the vibration of the vibrator mass in the first direction as a function of a phase correction signal applied thereto, each of the at least one phase adjusting capacitors including a stationary plate and a moveable plate, the moveable plate being coupled to the vibrator mass for movement therewith; and
a phase detector which detects the phase at which the vibrator mass vibrates in the first direction relative to the phase of the drive signal and generates the phase correction signal as a function of the detected phase.

2. The combination of claim 1, wherein the phase correction signal causes the vibration of the vibrator mass to be 90 degrees out of phase with the drive signal.

3. The combination of claim 1, wherein the vibrator includes a drive capacitor which receives the drive signal.

4. The combination of claim 3, wherein the drive capacitor includes a stationary plate and a moveable plate, the moveable plate being coupled to the vibrator mass for movement therewith.

5. The combination of claim 1, wherein the phase detector receives a signal indicative of the vibration of the vibrator mass from at least one phase detection capacitor coupled to the vibrator mass.

6. The combination of claim 5, wherein each of the at least one phase detection capacitors includes a stationary plate and a moveable plate, the moveable plate being coupled to the vibrator mass for movement therewith.

7. The combination of claim 1, further comprising an angular velocity detector for generating an angular velocity signal as a function of movement of the vibrator mass in the second direction.

8. The combination of claim 1, wherein the vibrator includes a spring structure which allows the vibrator mass to move in the first and second directions.

9. The combination of claim 1, wherein the drive signal has a frequency that is different than a resonance frequency of the vibrator mass.

10. A combination comprising:
a first vibrator including a first vibrator mass, the first vibrator mass being arranged to vibrate in first and second orthogonal directions;
a second vibrator including a second vibrator mass, the second vibrator mass being arranged to vibrate in third and fourth orthogonal directions, the third direction being different than the first direction;
a signal generator for generating a drive signal which is applied the first and second vibrators and causes the first and second vibrator masses to vibrate in the first and third directions, respectively;
at least one first phase adjusting capacitor coupled to the first vibrator mass and serving to adjust the phase of the vibration mass of the first vibrator in the first direction as a function of a first phase correction signal, each of the at least one first phase adjusting capacitors including a stationary plate and a moveable plate, the moveable plate of each respective first phase adjusting capacitor being coupled to the first vibrator mass for movement therewith;
a first phase detector which detects the phase at which the first vibrator mass vibrates in the first direction relative to the phase of the drive signal and generates the first phase correction signal as a function of the so detected phase;
at least one second phase adjusting capacitor coupled to the second vibrator mass and serving to adjust the phase of the vibration of the second vibrator mass in the third direction as a function of a second phase correction signal applied thereto, each of the at least one second phase adjusting capacitors including a stationary plate and a moveable plate, the moveable plate of each respective second phase adjusting capacitor being coupled to the second vibrator mass for movement therewith; and
a second phase detector which detects the phase at which the second vibrator mass vibrates in the third direction relative to the phase of the drive signal and generates the second phase correction signal as a function of the detected phase.

11. The combination of claim 10, wherein:
the first phase correction signal causes the vibration of the first vibrator mass to be 90 degrees out of phase with the drive signal; and
the second phase correction signal causes the vibration of the second vibrator mass to be 90 degrees out of phase with the drive signal.

12. The combination of claim 10, wherein:
the first vibrator includes a first drive capacitor which receives drive signal; and
the second vibrator includes a second drive capacitor which receives the drive signal.

13. The combination of claim 12, wherein:
the first drive capacitor includes a stationary plate and a moveable plate, the moveable plate of the first drive capacitor being coupled to the first vibrator mass for movement therewith; and
the second drive capacitor includes a stationary plate and a moveable plate, the moveable plate of the second drive capacitor being coupled to the second vibrator mass for movement therewith.

14. The combination of claim 10, wherein:
the first phase detector receives first signal from a phase detection capacitor coupled to the first vibrator mass; and
the second phase detector receives second signal from a phase detection capacitor coupled to the second vibrator mass.

15. The combination of claim 14, wherein:
the first phase detection capacitor includes a stationary plate and a moveable plate, the moveable plate of the first phase detection capacitor being coupled to the first vibrator mass for movement therewith; and the second phase detection capacitor includes a stationary plate and a moveable plate, the moveable plate of the second phase detection capacitor being coupled to the second vibrator mass for movement therewith.

16. The combination of claim 10, further comprising:

a first angular velocity detector for generating a first angular velocity signal as a function of movement of the first vibrator mass in the second direction; and a second angular velocity detector for generating a second angular velocity signal as a function of movement of the second vibrator mass in the fourth direction.

17. The combination of claim 10, wherein:

the first vibrator includes a first spring structure which allows the first vibrator mass to move in the first and second directions; and the second vibrator includes a second spring structure which allows the second vibrator mass to move in the third and fourth directions.

18. The combination of claim 10, wherein the drive signal has a frequency that is different than a resonance frequency of at least one of the first and second vibrator masses.

* * * * *